June 11, 1940.　　　R. C. TOWNSEND　　　2,204,108
TRAILER
Filed Aug. 4, 1937　　　3 Sheets-Sheet 1
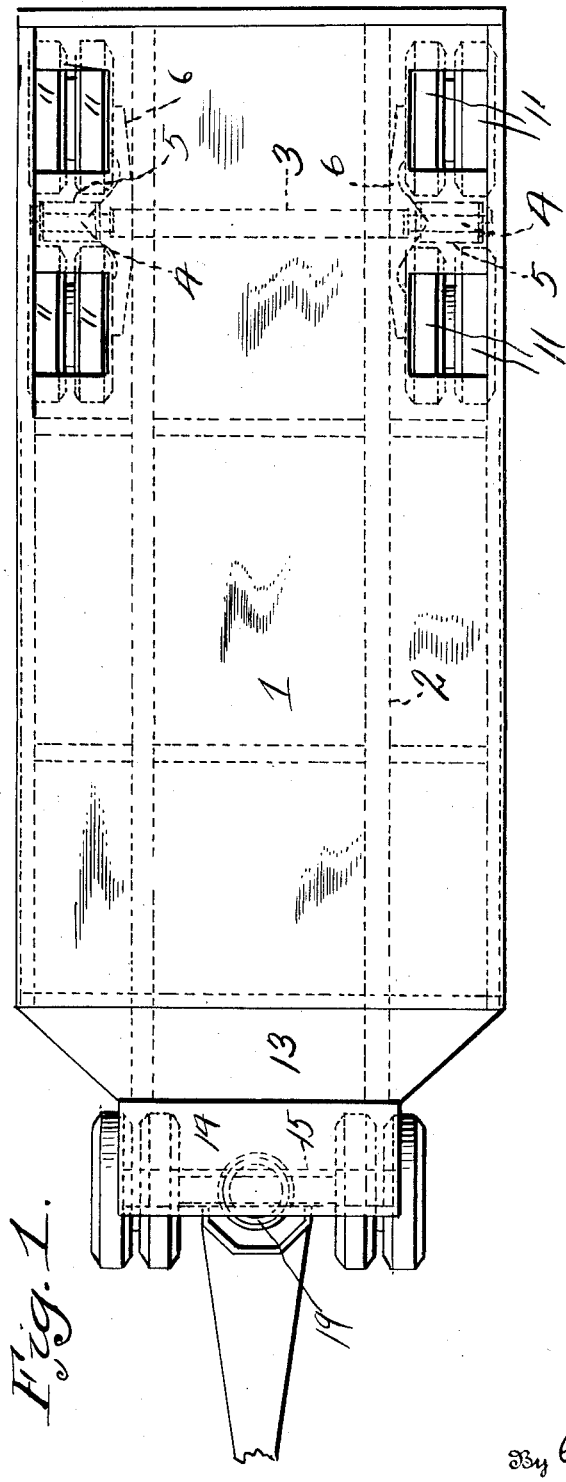
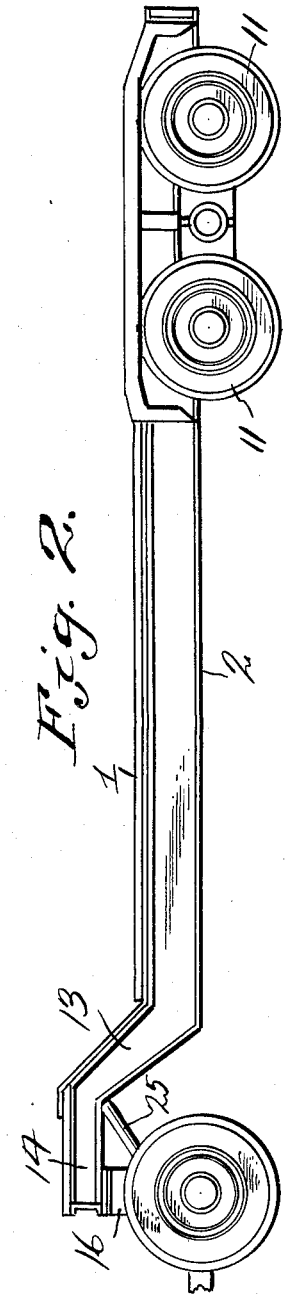
Inventor
R. C. Townsend
By Philip A. H. Sewell
Attorney Inventor
R. C. Townsend
By Philip A. Terrell
Attorney June 11, 1940. R. C. TOWNSEND 2,204,108
TRAILER
Filed Aug. 4, 1937 3 Sheets-Sheet 3
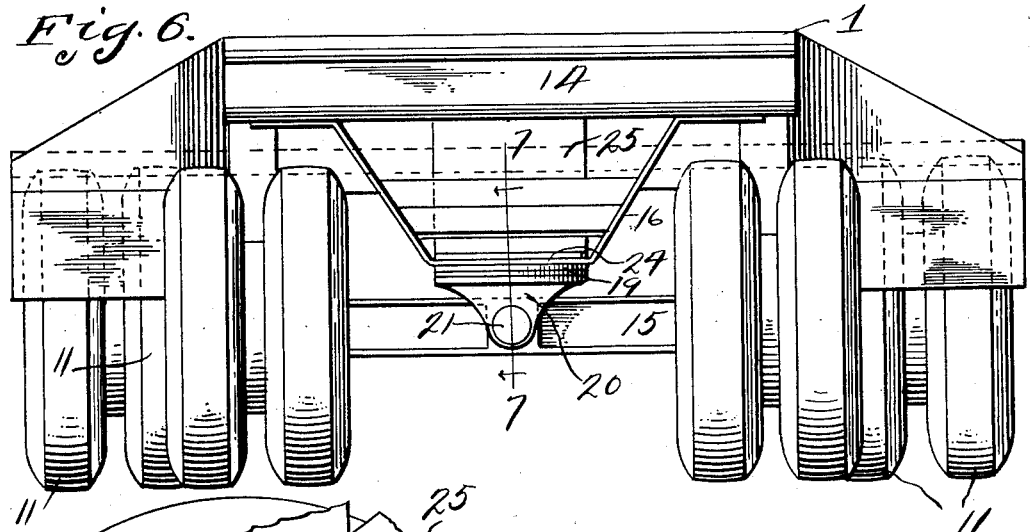
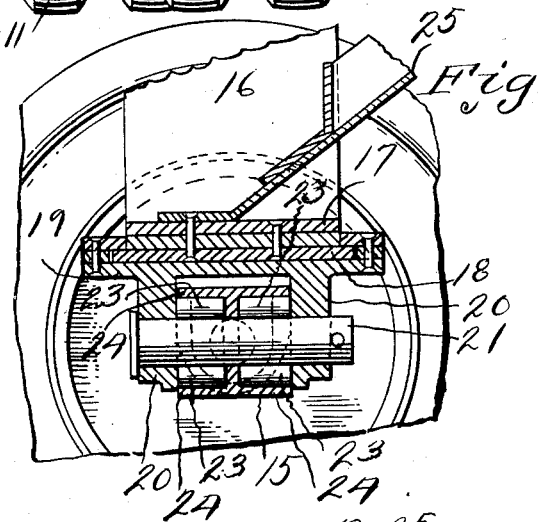
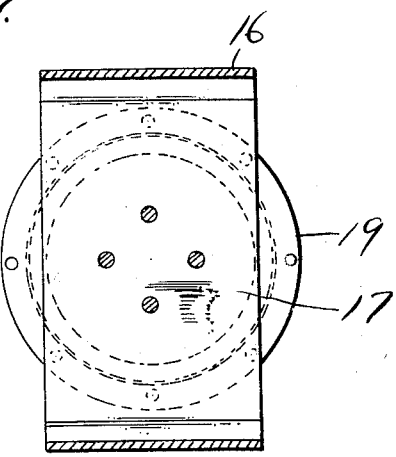
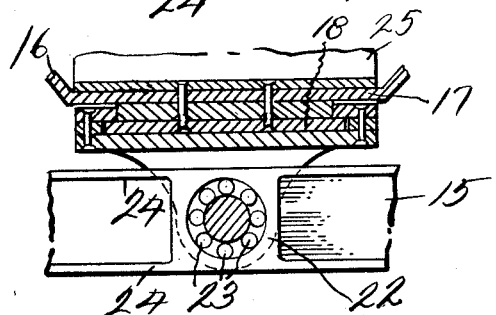
Inventor
R. C. Townsend
By Philip A. H. Jenell
Attorney Patented June 11, 1940

2,204,108

UNITED STATES PATENT OFFICE 2,204,108

TRAILER

Roy C. Townsend, La Crosse, Wis.

Application August 4, 1937, Serial No. 157,385

1 Claim. (Cl. 280—81)

The invention relates to trailers, and particularly to trailers for hauling heavy loads over roadways, and has for its object to provide a device of this kind wherein the axle mountings thereof are flexible and the rear wheels are in tandem arrangement and carried by rocker beams mounted on the axle spindles whereby the load is distributed over a large area of the road bed and over a plurality of wheels.

A further object is to provide the rocker beams with elongated bearing sleeves extending between the pairs of wheels, and in which the spindles are rotatably mounted, thereby distributing the load between the pairs of wheels and insuring the distribution of the proper load on each wheel.

A further object is to dispose the bearings of each pair of wheels and the axle spindle bearing in the same horizontal plane and in the same vertical longitudinal plane, thereby distributing the load equally over each wheel of each pair of wheels.

A further object is to rockably mount the forward axle and to provide a fifth wheel for the forward axle adjacent the forward axle, and relatively low, thereby obviating the necessity of providing braces for the forward axle, consequently allowing complete pivotal movement of the axle.

A further object is to mount the lower part of the fifth wheel on a bracket having arms disposed at opposite sides of the axle and a pivotal pin extending through the arms and axle and having anti frictional bearings within the axle.

A further object is to provide the downwardly extending pedestal with a fifth wheel disc rotatably mounted within a chamber of the lower portion of the fifth wheel and adapted to the axle, thereby lowering the fifth wheel and obviating the necessity of providing braces for the axle.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the trailer.

Figure 2 is a side elevation of the trailer.

Figure 6 is a front elevation of the trailer.

Figure 7 is a detail sectional view through the fifth wheel structure and axle taken on line 7—7 of Figure 6.

Figure 8 is a top plan view of the fifth wheel and a portion of the pedestal.

Figure 9 is a vertical transverse sectional view through the fifth wheel.

Figure 3:
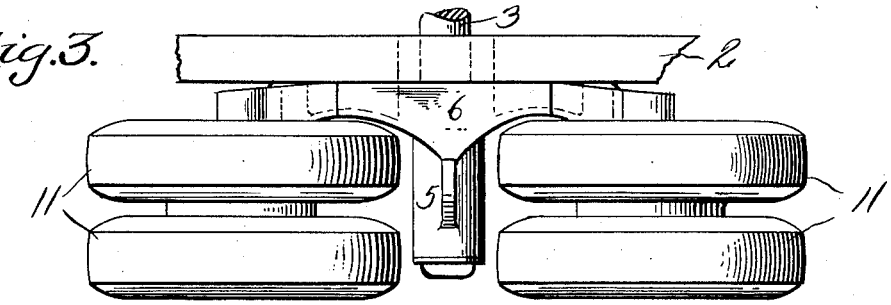
Figure 3 is an enlarged top plan view of one of the rocker beams, showing the tandem wheel arrangement thereon.
Figure 4:
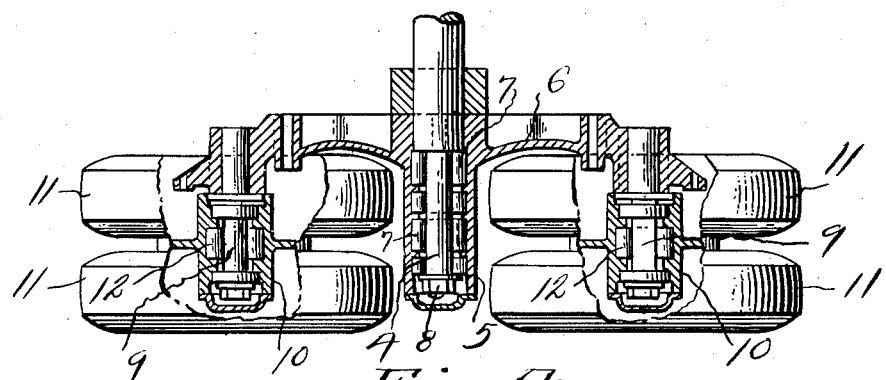
Figure 4 is a horizontal sectional view through one of the rocker beams and wheels carried thereby.
Figure 5:
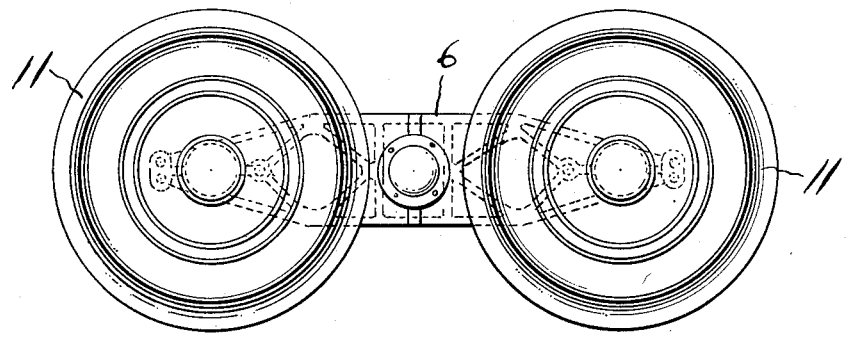
Figure 5 is a view in elevation of one of the rocker beams and wheels carried thereby.

Referring to the drawings, the numeral 1 designates the body of the trailer, which is supported on a frame 2. The side bars of the frame 2 extend rearwardly and have attached thereto in any suitable manner a conventional form of rear axle 3, the ends of which terminate in spindles 4 of conventional construction. The spindles 4 are mounted in sleeves 5 carried by the rocker beams 6, which are rockably mounted on the bearings 7 within the sleeves 5, so the rocker beams will rock in a vertical longitudinal plane as the trailer goes over the ground. Bearings 7 may be of any construction, however a nut 8 is provided on each spindle for taking up wear as end thrust wear develops. Rocker beams 6, at their forward and rear ends, are provided with outwardly extending spindles 9 extending into the sleeves 10 of each pair of wheels 11, which may be of conventional construction. Disposed within the sleeves 10 are bearings 12, and it will be noted by referring to Figure 4, that these bearings are centrally disposed between each pair of wheels on a vertical longitudinal center and in alinement horizontally and vertically with the bearing on the axle spindles 4, therefore it will be seen that the load is distributed between the wheels of each pair of wheels and between each pair of wheels, hence the load distribution will be over a large surface of the road bed, thereby causing the minimum damage thereto, and at the same time the rocker beams will rock during the movement of the vehicle.

It will be noted by providing rocker beams that the pairs of wheels will pass over irregularities without the usual pounding of the road bed as is the case where single wheels are used on the main axle spindle.

The forward end of the body 1 inclines upwardly and forwardly at 13, and terminates in a horizontal portion 14 above the forward axle 15. Extending downwardly from the body portion 14 is a pedestal 16, preferably V-shaped, and which pedestal has secured to its horizontal portion 17, the upper portion 18 of the fifth wheel. The upper portion of the fifth wheel is relatively close to the pivoted axle 15, and is rotatably mounted within a chamber of the lower fifth wheel portion 19, therefore, it will be seen that the axle may swing in a horizontal plane over a relatively wide range of movement, and by the low position of the fifth wheel, it will not be necessary to provide brace means for the axle 15. The lower fifth wheel portion 19 is provided with downwardly extending arms 20, at opposite sides of the axle 15, and which arms and horizontal pivot pin 21 form means whereby the axle may rock in various vertical planes as the vehicle moves over the ground. It will be noted that axle 15 is of I-beam type having an enlarged central portion 22 between the flanges thereof, and in which are disposed bearing elements 23 on which the pin 21 bears. Arms 20 engage the outer sides of the bearings 23, and in combination with the flanges 24 of the I-beam axle maintain the bearings in position. In other words the arms 20 form a closure for the bearng raceways. The lower end of the pedestal 16 is braced by an upwardly and rearwardly extending brace arm 25, and it will be noted that the upper portion of the fifth wheel is built up from a series of plates.

From the above it will be seen that a trailer is provided for heavy loads, which is entirely flexible forwardly and rearwardly, thereby allowing the same to easily pass over obstructions or irregularities within a road bed without undue pounding of the road bed, as many States have requirements as to the hauling of heavy loads over roads. It will also be seen that the rocker beam bearing and bearings of each pair of wheels are positioned in relation to each other whereby the load is distributed equally on all the wheels, and when desired the rocker beams can be removed, and single wheels may be placed on the axle spindles. It is to be understood, however, that various kinds of bearings may be used throughout the device.

The invention having been set forth what is claimed as new and useful is:

In a vehicle running gear, a transversely disposed axle extending beyond the vehicle frame, a main bearing on said axle, a rocker beam mounted intermediate its ends on said bearing, stub axle members carried by the ends of said rocker beam and equidistant from said main bearing, bearings carried by said stub axles, pairs of wheels mounted on said second mentioned bearings and located on one side of said beam only, all of said bearings being so located their axes are disposed in the same horizontal plane and so disposed that a vertical longitudinal plane will pass through their mid sections and between the wheels of said pairs of wheels, whereby the weight of a vehicle will be equally distributed on all of said wheels.

ROY C. TOWNSEND.